United States Patent [19]

Meyer

[11] Patent Number: 5,078,247
[45] Date of Patent: Jan. 7, 1992

[54] FRICTION CLUTCH WITH DOMED DIAPHRAGM SPRING TONGUES

[75] Inventor: Alfred Meyer, Schweinfurt, Fed. Rep. of Germany

[73] Assignee: Fichtel & Sachs AG, Schweinfurt, Fed. Rep. of Germany

[21] Appl. No.: 638,624

[22] Filed: Jan. 8, 1991

[30] Foreign Application Priority Data

Jan. 13, 1990 [DE] Fed. Rep. of Germany .. 9000323[U]

[51] Int. Cl.[5] .............................................. F16D 13/50
[52] U.S. Cl. ................................ 192/70.27; 192/89 B
[58] Field of Search ............... 192/70.27, 89 B, 106 R

[56] References Cited

U.S. PATENT DOCUMENTS

| | | | |
|---|---|---|---|
| 2,234,756 | 3/1941 | Geyer | 192/70.27 X |
| 2,885,047 | 5/1959 | Kehrl | 192/70.27 X |
| 3,235,049 | 2/1966 | Hufstader | 192/89 B |

FOREIGN PATENT DOCUMENTS

| | | |
|---|---|---|
| 1027999 | 4/1958 | Fed. Rep. of Germany .... 192/89 B |
| 1450163 | 5/1969 | Fed. Rep. of Germany . |
| 3304670 | 8/1984 | Fed. Rep. of Germany . |
| 3304671 | 8/1984 | Fed. Rep. of Germany .... 192/89 B |
| 8802826 | 4/1988 | Japan . |
| 1445657 | 8/1976 | United Kingdom . |
| 1527641 | 10/1978 | United Kingdom . |
| 2181193 | 4/1987 | United Kingdom . |
| 2186642 | 8/1987 | United Kingdom . |

*Primary Examiner*—Rodney H. Bonck
*Attorney, Agent, or Firm*—Toren, McGeady & Associates

[57] ABSTRACT

In order to avoid undesired spring force variations of a diaphragm spring (13) of a friction clutch by reason of centrifugal forces it is proposed to provide the spring tongues (17) between their tongue ends (25) and a basic body (15) of the diaphragm spring (13) with outwardly domed portions (31) by which the center of gravity (33) in the position of the diaphragm spring (13) endangered by centrifugal force is shifted into the plane of radial supporting of the diaphragm spring (13).

3 Claims, 2 Drawing Sheets

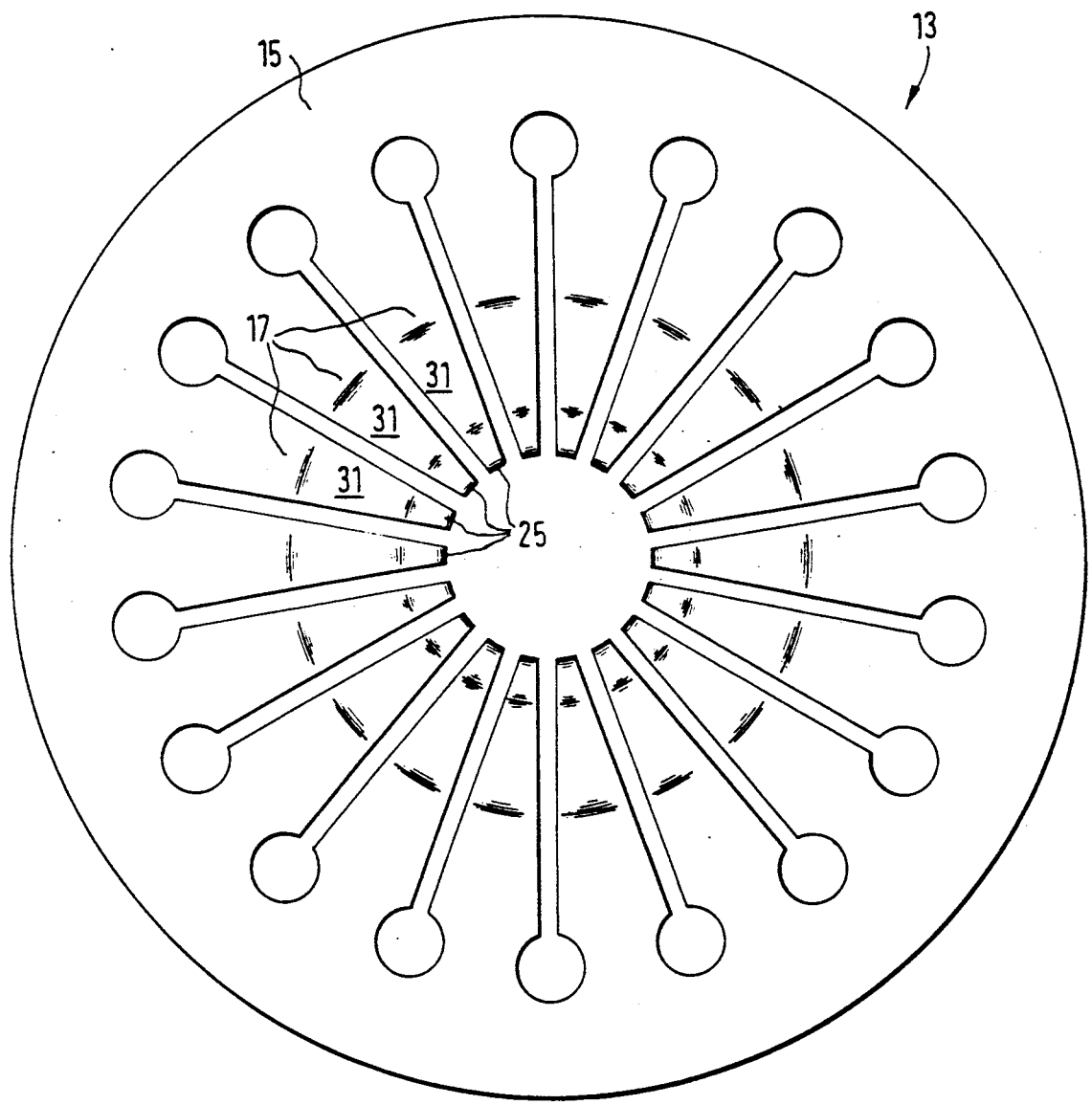

FRICTION CLUTCH WITH DOMED DIAPHRAGM SPRING TONGUES

BACKGROUND OF THE INVENTION

The invention relates to a friction clutch for a motor vehicle and especially to a friction clutch having a diaphragm spring.

Conventional friction clutches for motor vehicles, such as are known for example from DE-A-3,304,670, have a clutch cover secured on a fly-wheel of the internal combustion engine of the motor vehicle, a presser plate arranged axially between the fly-wheel and the clutch cover and guided non-rotatably but axially movably in relation to the clutch cover, and a clutch disc arranged between the presser plate and the fly-wheel and provided with friction linings. A diaphragm spring braces the clutch disc between the fly-wheel and the presser plate. The diaphragm spring has an annular basic body, which at least in the initially unstressed condition is of taper form, and a plurality of spring tongues protruding from the basic body radially towards the axis of rotation. In the clutch as known from DE-A-3,304,670 the diaphragm spring is loosely supported on the presser plate in the region of the external circumference of the basic body, while it is fixed on a circle of smaller diameter with the aid of securing means, both axially and radially on the clutch cover. A clutch releaser rests on the radially inner ends of the spring tongues. The releaser shifts the tongue ends of the diaphragm spring, installed with initial stress, against the stress force towards the fly-wheel, for the disengagement of the clutch. In the known clutch individual spring tongues are provided with outwardly domed portions by which ventilation openings are produced between adjacent spring tongues for the interior of the clutch.

Diaphragm springs ordinarily have a spring force/spring travel characteristic which firstly rises, starting from the relaxed condition, to a maximum, then falls off with increasing spring travel to a minimum, in order then to rise again. In order to achieve a minimum possible variation of the spring force during the life of the clutch, the diaphragm spring is usually installed with initial stress in such a manner that in the engaged condition it is situated on the far side of the maximum on the falling branch of the characteristic. This has the consequence that the spring force decreases with increasing spring travel towards the disengagement position. In a new clutch the spring force achievable in the disengaged position is at a minimum. With increasing wear of the friction linings of the clutch disc the clutch engagement position shifts more and more towards the maximum of the characteristic, with the consequence that the spring force in the clutch engagement position increases with growing wear.

It has appeared that the high rotation rates achievable with modern internal combustion engines exert centrifugal forces upon the spring tongues of the diaphragm spring which undesiredly influence the spring force characteristic of the diaphragm spring. As a consequence of their basic for example cranked form or by reason of the actuation by the clutch releaser, diaphragm spring tongues can be set obliquely of the axis of rotation, with the consequence that they are drawn outwards by centrifugal forces, and increase or decrease the spring force of the diaphragm spring according to the direction of their oblique positioning. In a new clutch, in which, as mentioned above, the spring force is at the minimum in relation to the life of the clutch, this can have the consequence that the return force of the diaphragm spring no longer suffices to engage the clutch again automatically. The clutch thus remains hanging. On the other hand towards the end of the life of the clutch, by reason of such an oblique placing of the spring tongues, in the engaged position the pressure application force can become unacceptably high.

It is already known from DE-A-1,450,163, in a friction clutch with a dished spring clamped in between the clutch cover and a presser plate, to lift away the presser plate by means of several clutch levers against the force of the dished spring. The clutch levers are mounted on the clutch cover through joints on the side of the clutch cover axially remote from the dished spring and connected by way of intermediate levers through the clutch cover with the presser plate. The clutch levers are designed so that their centre of gravity is offset in relation to the articulation axis in the axial direction of the clutch, so that the centrifugal forces acting upon the clutch levers act in the engagement direction and thus support the force of the dished spring in every pivotal position of the clutch levers.

SUMMARY OF THE INVENTION

The invention provides a friction clutch for a motor vehicle in which variations of the diaphragm spring force occurring according to centrifugal force at the beginning and/or at the end of the life of the clutch are largely avoided.

The invention is based upon a friction clutch having a clutch cover intended for securing to a fly-wheel, rotating about a rotation axis, of an internal combustion engine, with a presser plate arranged on the side of the clutch cover axially facing the fly-wheel and guided nonrotatably but axially movably in relation to the clutch cover, a clutch disc arranged on the side of the presser plate axially facing the fly-wheel and provided with friction linings, and with a diaphragm spring which embraces an annular basic body and a plurality of spring tongues standing away from the basic body radially of the rotation axis, the diaphragm spring being supported in the region of the basic body along a first diameter circle axially on the presser plate and along a second diameter circle on the clutch cover axially and radially with axial initial stress pressing the presser plate to the fly-wheel. The spring tongues have radially inner tongue ends intended for abutment on a clutch releaser and are moved by means of the clutch releaser in common against the initial stress between one end position engaging the clutch and one end position disengaging the clutch.

The improvement in accordance with the invention consists in that all spring tongues comprise, on the same axial side, radially between the tongue ends and the basic body, an outward doming each which in one of the end positions of the tongue ends protrudes towards the respective other end position and the axial height of which is so dimensioned that the centre of gravity of the annular zone of the diaphragm spring, defined by the spring tongues, in the one said end position lies substantially in a plane of rotation extending through the region of the radial supporting of the diaphragm spring and perpendicular to the axis of rotation.

By this measure the centre of gravity of the spring tongues in the end position endangered by incorrect functions is laid into a position in which the centrifugal forces generate substantially no axial force components acting upon the spring tongues. If by reason of its dimensioning in a new clutch the diaphragm spring tends to stick, then the outward domings are formed into the spring tongues so that in the disengaged position they protrude towards the engaged position and the centre of gravity of the spring tongues lies in the plane normal to the axis and extending through the radial supports of the diaphragm spring. If on the other hand the diaphragm spring tends by reason of its dimensioning and shaping, towards the end of the life of the clutch, to an undesiredly high spring force, then the outward domings of the spring tongues are fitted so that in the engagement position of the spring tongues they protrude towards the disengagement position and the centre of gravity in the engagement position lies in the said plane normal to the axis, of the radial supporting of the diaphragm spring. The above principle can be applied in both pulled-type and pushed-type clutches. The axial height of the doming preferably lies between once and twice the material thickness of the diaphragm spring. Various features of novelty which characterize the invention are pointed out with particularity in the claims annexed to and forming part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWINGS

FIG. 1 shows a partial diagrammatic axial longitudinal section through a friction clutch of a motor vehicle and FIG. 2 shows a plan view of a diaphragm spring of the clutch according to FIG. 1.

DETAILED DESCRIPTION OF THE DRAWINGS

Figure 1:
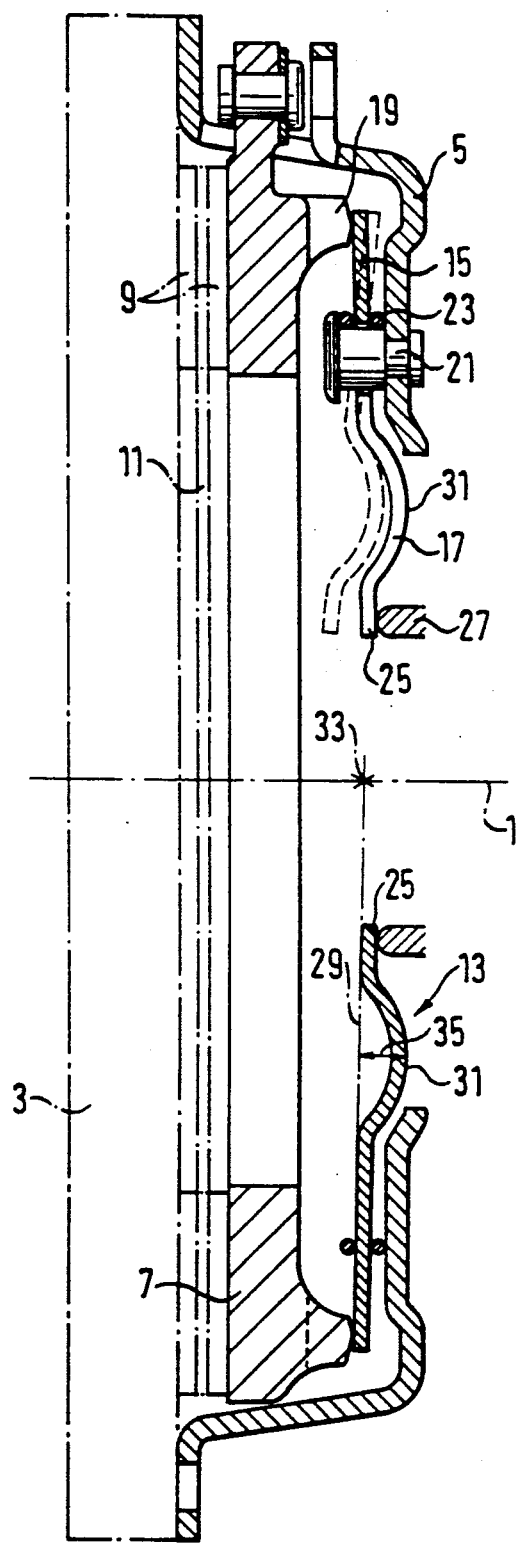

The pressed-type friction clutch as in the example of embodiment as illustrated comprises a fly-wheel 3 driven about a rotation axis 1 by an internal combustion engine (not shown further) of the motor vehicle, to which fly-wheel a clutch cover 5 is secured. Between the clutch cover 5 and the fly-wheel 3 there is arranged a presser plate 7 guided non-rotatably but axially movably on the clutch cover 5. Between the fly-wheel 3 and the presser plate 7 there is provided a clutch disc 11 provided with friction linings 9 and coupled in the usual way with a gearing (not shown) of the motor vehicle. An initially stressed diaphragm spring 13 arranged between the presser plate 7 and the clutch cover 5 presses the presser plate 7, through the friction linings 9, against the fly-wheel 3. The diaphragm spring 13 has an annular basic body 15 which is of taper form in the relaxed, that is uninstalled condition, from the internal circumference of which a plurality of spring tongues 17 distributed in the circumferential direction protrudes radially inwards. The basic body 15 is supported in the region of its external circumference on projections 19 of the presser plate 7 and fixed in the foot region of the spring tongues 17 through rivet bolts 21 radially and axially on the cover 5. The basic body 15 is tiltably supported on the cover 5 through wire rings 23. A clutch releaser indicated at 27 which tips the diaphragm spring 13 out of the engaged position represented in solid lines in FIG. 1 into the disengaged position represented in chain lines, rests on the radially inner tongue ends 25 of the spring tongues 17. The spring tongues 17 are here pressed against the initial stress force of the diaphragm spring 13 to the fly-wheel 3, whereby the basic body 15 of the diaphragm spring tilts about the wire ring 23 and thereby relieves the presser plate 7.

In the engaged position the basic body 15 and the tongue ends 25 of the spring tongues 17 extend approximately in a plane extending perpendicularly of the rotation axis 1 and indicated at 29. In order to prevent, in the case of a new clutch, centrifugal forces from acting upon the spring tongues 17, in the disengaged position, which forces would load the diaphragm spring additionally in the disengagement direction and thus, by reason of the spring travel/spring force characteristic of the diaphragm spring would effect a weakening of the spring force, all spring tongues 17 are provided radially between the basic body 15 and the tongue ends 25 with an outward doming 31 protruding towards the clutch engagement position. The doming 31 shifts the centre of gravity 33 of the annular zone or the diaphragm spring 13, defined by the spring tongues 17, so far in the clutch engagement direction that it lies in the disengagement position approximately in a plane normal to the rotation axis 1, which extends through the position of radial supporting of the diaphragm spring 13 on the cover 5, that is through the radial support position determined by the wire rings 23 and the securing rivets 21. Thus centrifugal forces in the disengaged position cannot generate any axial forces acting on the spring tongues 17, which in the case of a new clutch in unfavourable situations could lead to sticking of the clutch.

The axial height 35 of the domings 31 of the spring tongues 17 amounts expediently to one to ten times the material thickness of the diaphragm spring 13.

While specific embodiments of the invention have been shown and described in detail to illustrate the application of the inventive principles, it will be understood that the invention may be emobodied otherwise without departing from such principles.

What I claim is:

1. A friction clutch for a motor vehicle, comprising a clutch cover (5) intended for fastening on a fly-wheel (3), rotating about a rotation axis (1), of an internal combustion engine,
   a presser plate (7) guided non-rotatably but axially movably in relation to the clutch cover (5) and arranged on the side of the clutch cover (5) axially facing the fly-wheel (3),
   a clutch disc (11) provided with friction linings (9) and arranged on the side of the presser plate (7) axially facing the fly-wheel (3) and
   a diaphragm spring (13) comprising a radially outer annular planar basic body (15) and a plurality of spring tongues (17) projecting radially inwardly from the basic body (15) towards the rotation axis (1), the diphragm spring is supported in the region of the basic body (15) axially along a first diameter circle on the presser plate (7) and axially and radially along a second diameter circle on the clutch cover (5), with axial stress pressing the presser plate (7) towards the fly-wheel (3), the spring tongues (17) have radially inner tongue ends (25) arranged to abut on a clutch releaser (27), in common against the initial stress between a first end position engaging the clutch and a second end position disengaging the clutch, wherein all the spring tongues (17) each comprise, on the same axial side between the tongue ends (25) and the basic body (15), an outwardly domed portion (31) first curving outwardly from the plane of said basic body (3) and then curving inwardly towards the plane of said basic body (3) and which in one of the end positions of the tongue ends (25) protrudes towards the respective other end position and the axial height (35) from the plane of said basic body is so dimensioned that the centre of gravity (33) of an annular zone, defined by the spring tongues (17), of the diaphragm spring in the said one end position lies substantially in a plane (29) of rotation perpendicular to the rotation axis (1) and extending through a region of a radial support (21, 21) of the diaphragm spring (15).

2. A friction clutch according to claim 1, wherein the outwardly domed portions (31), in the disengaged second end position, protrude towards the engaged first end position and are so dimensioned that the centre of gravity (33) of the spring tongue annular zone in the disengaged second end position lies substantially in the plane (29) of the radial support (21, 23) of the diaphragm spring (13), and the second diameter circle has a smaller radius than the first diameter circle and in that the domed portions (31) protrude in a direction directed away from the fly-wheel (3).

3. A friction clutch according to claim 1, wherein the axial height (35) of the domed portions (31) amounts to one to ten times the material thickness of the diaphragm spring (13).

* * * * *